US012716443B2

(12) United States Patent
Leese et al.

(10) Patent No.: US 12,716,443 B2
(45) Date of Patent: Aug. 25, 2026

(54) TELESCOPING COMPONENT UNLOCKING SYSTEM AND FOLLOWER

(71) Applicant: Kammok Holdings, LLC, Austin, TX (US)

(72) Inventors: Sean Leese, Austin, TX (US); Henry Parker, Austin, TX (US); Chris Eddy, Austin, TX (US); Greg McEvilly, Austin, TX (US)

(73) Assignee: Kammok Holdings, LLC, Austin, TX (US)

( * ) Notice: Subject to any disclaimer, the term of this patent is extended or adjusted under 35 U.S.C. 154(b) by 286 days.

(21) Appl. No.: 18/386,121

(22) Filed: Nov. 1, 2023

(65) Prior Publication Data

US 2024/0141937 A1 May 2, 2024

Related U.S. Application Data

(60) Provisional application No. 63/421,268, filed on Nov. 1, 2022.

(51) Int. Cl.
*F16B 7/10* (2006.01)

(52) U.S. Cl.
CPC .................................. *F16B 7/105* (2013.01)

(58) Field of Classification Search
USPC ........................ 403/329, 109.1, 109.3, 109.7
See application file for complete search history.

(56) References Cited

U.S. PATENT DOCUMENTS

| | | | | |
|---|---|---|---|---|
| 3,811,455 A * | 5/1974 | Thur | A45B 19/04 | 135/25.4 |
| 4,415,292 A * | 11/1983 | Alperson | F16B 7/0446 | 403/329 |
| 4,431,331 A * | 2/1984 | Brody | F16B 7/0446 | 403/189 |
| 5,387,048 A * | 2/1995 | Kuo | A45B 19/04 | 135/25.1 |
| 5,775,352 A * | 7/1998 | Obitts | A45B 9/00 | 135/65 |
| 6,338,587 B1 * | 1/2002 | Kuo | F16B 7/105 | 190/115 |
| 6,343,404 B1 * | 2/2002 | Kuo | F16B 7/105 | 280/655 |
| 6,343,890 B1 * | 2/2002 | Benson | F16B 7/105 | 403/109.8 |
| 6,371,686 B1 * | 4/2002 | Wu | F16B 7/105 | 135/25.1 |
| 7,219,386 B2 * | 5/2007 | Tsuchiya | B25G 1/04 | 285/302 |
| 8,246,267 B2 * | 8/2012 | Svedberg | F16B 7/042 | 403/109.8 |

(Continued)

*Primary Examiner* — Daniel J Wiley

(74) *Attorney, Agent, or Firm* — Travis Banta; Ascent IP Law

(57) ABSTRACT

A follower device is disclosed which includes a friction surface, a neck, and at least one shelf. The at least one friction surface and the at least one shelf may extend from the neck, and the slot may be adjacent to the neck. The follower may be disposed in a telescoping tube and allow closure or retraction of the telescoping tube automatically by pulling on an inner tube to disengage a button lock, termed an overpull and then collapsing the telescoping tube without interference from the button lock.

18 Claims, 3 Drawing Sheets

(56) References Cited

U.S. PATENT DOCUMENTS

| | | | | |
|---|---|---|---|---|
| 8,491,215 | B2 * | 7/2013 | Young | B25G 3/18 403/109.3 |
| 8,974,261 | B2 * | 3/2015 | Kicker | B63H 16/04 440/101 |
| 10,907,676 | B2 * | 2/2021 | Klein | F16B 7/042 |
| 2005/0097691 | A1 * | 5/2005 | Tsuchiya | B25G 3/18 15/144.4 |
| 2015/0216272 | A1 * | 8/2015 | Paybins | A45B 3/04 294/198 |
| 2016/0053789 | A1 * | 2/2016 | Wang | A61H 3/00 248/407 |
| 2016/0238049 | A1 * | 8/2016 | Bruneel | F16B 7/105 |
| 2022/0362922 | A1 * | 11/2022 | Tata | F16B 7/042 |

* cited by examiner 135
150
140
145
160
155
130
125
120
105
115
110

100
175
180A
180B
180C
170
165
200
125
130
210
160
135
150
140
145
205
120
115
105
110

200
115
110
120
105
140
150
155
135
125
130

TELESCOPING COMPONENT UNLOCKING SYSTEM AND FOLLOWER

PRIORITY CLAIM

This application is a non-provisional patent application which claims the benefit of and priority to U.S. Provisional Patent Application No. 63/421,268, filed on Nov. 1, 2022.

BACKGROUND

This disclosure relates generally to telescoping objects, and more specifically to locking and unlocking mechanisms for such objects.

Telescoping objects have a long history. Although, the first iteration of a telescoping object is difficult to identify, the adjective itself suggests that the technology came into wide public awareness after the invention of the telescope around the turn of the $17^{th}$ century. While the earliest telescopes were not themselves telescoping, the technology was applied to telescopes not long after the initial discovery. Iterations of the technology through time include inventions familiar to many. Telescoping fishing rods made from steel tubes were developed in the late 1800s. Telescoping technology was further applied to an extension pole for helping painters reach areas to pain without a need to climb or work from a ladder.

The usefulness of telescoping objects derives from the compactness and often lighter weight of such objects in comparison with other alternatives. Prior to the invention of telescoping tools, people had to strain, jump, and stand on stools, buckets, or whatever was at hand to reach their objective. These actions all too often resulted in injuries from falls, dropped items, and the like. Further, non-telescoping objects such as support poles were cumbersome due to their length and weight, and therefore were difficult to transport and use.

Telescoping objects are ubiquitous in modern times. The usefulness of telescoping objects has resulted in expansion of the technology into an incredible variety of applications. The technology has reached into sports with the invention of a telescoping lacrosse stick, for example, and even into fashion through telescoping high heels. Other iterations of telescoping objects have found their way into the retail industry through telescoping shopping carts, the construction industry through telescoping ladders and levels, and the outdoors industry through support poles for tents, awnings, stool bases, and the like. Telescoping sprayers have been useful in the agriculture industry, while the communications industry has greatly benefited from telescoping antennas familiar to anyone with a radio or television antenna. Further, many are familiar with objects such as telescoping handles on luggage and extendable pointers used in education.

Locking mechanisms significantly enhance the usefulness of telescoping objects. This fact is readily apparent when one considers some of the objects already mentioned such as ladders, antenna's, lacrosse sticks, and the like. To be useful, these items must remain in their extended positions whether the load pushing on them is as insignificant as the weight of the upper portions of a small radio antenna or as significant as a person climbing a ladder.

A variety of locking and unlocking mechanisms for telescoping objects have been developed. In some cases, there is no lock component per se, but the telescoping components themselves are tapered such that when placed in an extended position the large end of a smaller component is larger than the small end of a larger component. In such a system, the friction between the components when drawn into the extended position causes the components to lock into place. Examples of such a system would be an extendable radio antenna, an extendable pointer, or a collapsible fishing rod. Such systems cannot resist a significant force, and therefore, a variety of locks have been developed to resist greater forces, each with their own advantages. Some examples of such locks include clutch locks, which utilize a cylindrical clutch and an inner bushing to lock the telescoping components by twisting the clutch, collar locks, which include a collar that can be tightened with a knob to secure the telescoping components in place, cam locks, with a cam on the interior of the telescoping components that locks the telescoping components by twisting one component in relation to another, and spring button locks, which employ a springing button of an inner component to snap into a corresponding hole of an outer component to secure the components' relative positions.

The locking mechanisms for telescoping objects often present challenges in the specific contexts in which they are used. For example, in the case of telescoping support poles for some objects, it can be quite difficult to adequately handle the object being supported by the poles while locking and/or unlocking the poles into place during setup or take down. This is because it often requires both hands to use the locking mechanism. When a single person has both hands occupied with the locking mechanism it can be difficult or impossible to simultaneously handle the other components of an object as necessary.

Because of these challenges in adequately utilizing a locking and unlocking mechanism while at the same time handling other components as needed for proper setup or takedown of equipment, there is a need for a locking and unlocking system that is easily implemented with minimal user manipulation.

SUMMARY

A follower device is disclosed which includes a friction surface, a neck, and at least one shelf. The at least one friction surface and the at least one shelf may extend from the neck, and the slot may be adjacent to the neck.

A telescoping component unlocking system includes a first telescoping component having at least one locking hole and a second telescoping component having at least one buttonhole. The system further includes a follower having at least one friction surface, a neck, at least one shelf, and a slot which extend from the neck. The slot may be adjacent to the neck. The system further includes a button having at least one button head and at least one button tail, which extends from the button. The button is insertable into the slot of the follower. The button and at least a portion of the follower are attachable to the second telescoping component. The second telescoping component and at least a portion of the follower are attachable to the first telescoping component.

BRIEF DESCRIPTION OF THE DRAWINGS

These and other features, aspects, and advantages of the disclosed embodiments will become better understood with regard to the following description, appended claims, and accompanying drawings:

DETAILED DESCRIPTION

As used herein, the term "assembly" refers to a collection of individual parts or elements that have been fixed together either rigidly or into a pivoting, sliding, or other configuration such that they cannot be readily separated from each other.

Unless otherwise stated, all technical terms have the same meaning as commonly understood by one with ordinary skill in the art to which this telescoping component unlocking system belongs; all non-technical terms have the same meaning as commonly understood in general art and should not be strictly interpreted as their dictionary definition.

In reading the following description, various alternative design embodiments for different elements of the telescoping component unlocking system and combinations of these elements will be discussed. The description will not list every possible combination of these alternative elements, nevertheless the specification and claims should be read with the understanding that these combinations are within the scope of the disclosure and the claims.

It should also be understood while reading the following disclosure that if the material of a piece is not explicitly specified or options discussed in passage, that the material used to create a particular element is within the scope of ordinary artisans and encompassed within of the disclosure and the claims.

Examples and embodiments of the telescoping component unlocking system are described herein. The following disclosure is not intended to limit the disclosure to the embodiment illustrated in figures or to embodiments described below.

Figures 1, 2A, 2B:
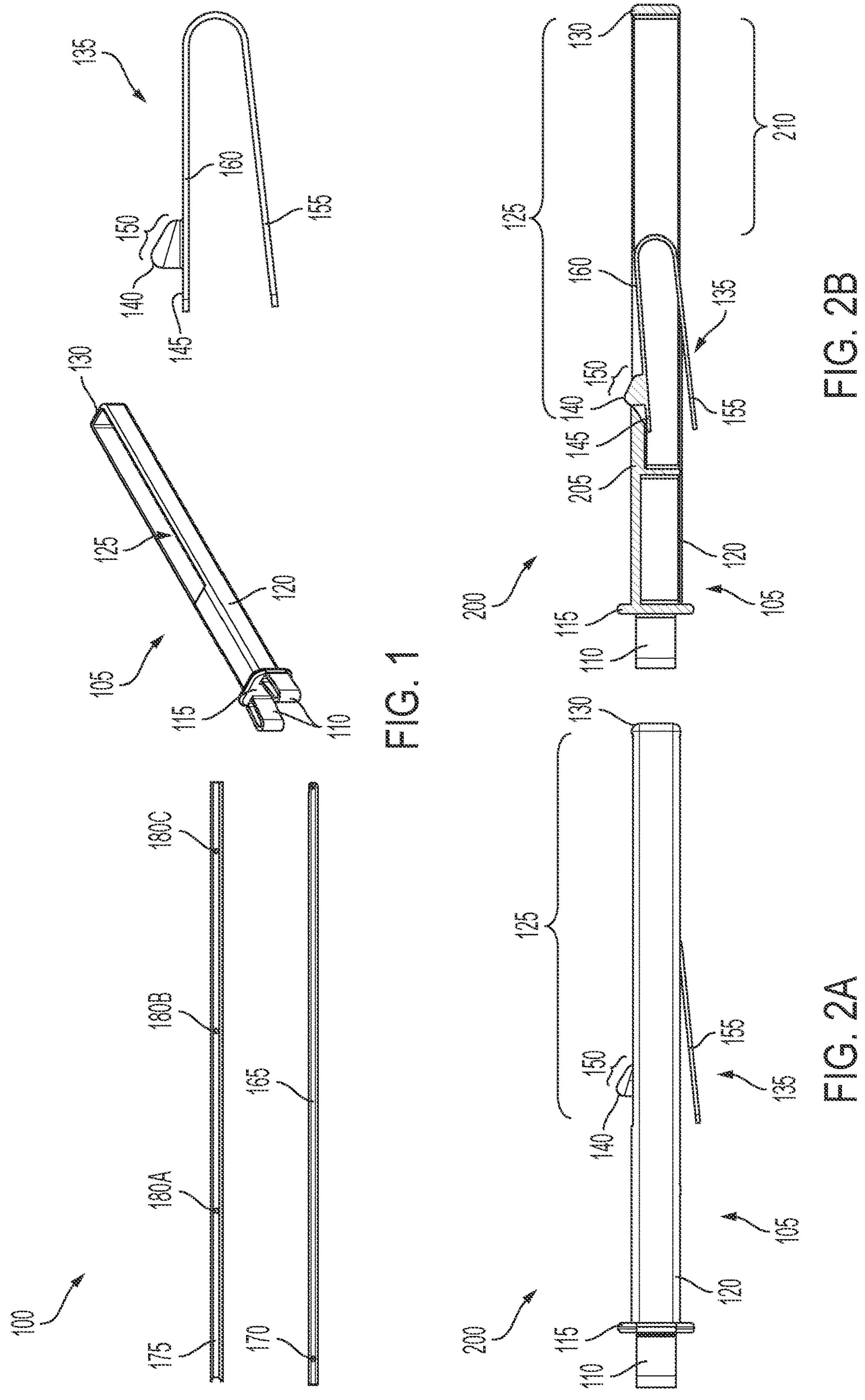
FIG. 1 illustrates an exploded view of an embodiment of a telescoping component unlocking system.
FIG. 2A illustrates a side view of an embodiment of a button-follower assembly.
FIG. 2B illustrates a cross sectional view of an embodiment of a button-follower assembly.

FIG. 1 illustrates an expanded view of an embodiment of a telescoping component unlocking system. As in FIG. 1, some embodiments may be included in a telescoping tube assembly 100 which may comprise an outer telescopic tube 175, a follower 105, a spring button 135, and an inner telescopic tube 165. Outer telescopic tube 175 may include locking holes 180A-C. Follower 105 may include friction surfaces 110, a follower head 115, a follower neck 120, a follower slot 125, and a follower tail 130. Additionally, follower 105 may include other component parts as described hereafter. Spring button 135 may include a button head 140, a button tail 145, a button ramp 150, a button top 160 and a button bottom 155. Inner telescopic tube 165 may include a buttonhole 170.

While only two tubes are shown in FIG. 1, any number of telescoping tube portions may be included as needed for a given application in this embodiment. Additionally, some embodiments may not be limited to tubes having a square cross section as shown in FIG. 1. Any shape of tube known to those of ordinary skill in the art may be used. Examples of other shapes of tubes may include tubes having a rectangular cross section, a circular cross section, a hexagonal cross section, a circular cross section with an indentation for keeping an interior tube and an exterior tube in alignment, and so forth. Still other embodiments may include components that are not tubular in nature. For example, a system where telescoping tubes are replaced by one or more flat surfaces, wherein the surfaces telescope and lock together.

The telescoping component unlocking system is not limited to the use of a bent spring button 135 as shown in FIG. 1. In some embodiments, spring button 135 may have a multi-part assembly, for example using a separate spring to insert a button head into the locking hole 180A. Additionally, some embodiments may have multiple button heads which lock into two or more locking holes 180A-C. Locking holes 180A-C may be placed adjacent to one another, on opposing surfaces, or in any other configuration known to those of ordinary skill in the art. Similarly, button heads may be placed adjacent to each other, opposite one another, or in any other configuration known to those of ordinary skill in the art so as to correspond with locking holes 180A-C of a given embodiment.

The telescoping component unlocking system is not limited to a specific number of locking holes. For example, some embodiments may include one, two, three, or many locking holes in an outer telescoping component. Additionally, the telescoping component unlocking system is not limited to a follower with two friction surfaces as shown in FIG. 1. Some embodiments may include a follower with one, two, three, four, or more friction surfaces. Further, in some embodiments the follower need not include a tail that fully encloses the follower slot. For example, one or both of the follower sides defining the slot may be formed to catch the spring button, causing the follower to move with the spring button and the telescoping component during extension.

In some embodiments, inner telescopic tube 165 and outer telescopic tube 175 may be constructed using a metal, composite, fiberglass, plastic, or other durable material known to those of ordinary skill in the art, with sufficient resilience to withstand stresses placed thereon. Spring button 135 and follower 105 may also be constructed using a metal, composite, fiberglass, plastic, spring steel, or other durable material known to those of ordinary skill in the art, with sufficient resilience to withstand stresses placed thereon. Additionally, in some embodiments spring button 135 may be constructed using an elastic material or in a way that spring button 135 has the qualities of a spring, or has a spring component. For example, in some embodiments such as the embodiment shown in FIG. 1, spring button 135 may be constructed of a material that allows button top 160 and button bottom 155 to be compressed toward each other while allowing button top 160 and button bottom 155 to spring back to an uncompressed position when the compressing force is removed. In some embodiments, friction surfaces 110 of follower 105 may be constructed of a different material than follower 105 itself. Friction surfaces 110 may be constructed from materials that create friction with the interior surface of outer telescopic tube 175 depending upon the material of outer telescopic tube 175. For example, friction surfaces 110 may be constructed using a metal, composite, fiberglass, plastic, rubber, glass or other material known to those of ordinary skill in the art.

FIG. 2A illustrates a side view of an embodiment of a button-follower assembly 200. In this and other embodiments, follower 105 assembly may include follower 105 and spring button 135. Follower 105 may include friction surfaces 110, follower head 115, follower neck 120, follower slot 125, and follower tail 130. Additionally, follower 105 may include other component parts as described hereafter. Spring button 135 may include button head 140, button tail 145, button ramp 150, button top 160 and button bottom 155. In FIG. 2A, spring button 135 is disposed within follower slot 125 such that only button head 140, a portion of button ramp 150, and button bottom 155 are visible.

FIG. 2B illustrates a cross sectional view of an embodiment of a button-follower assembly 200. As in FIG. 2A, follower 105 assembly in FIG. 2B shows follower 105 and spring button 135. FIG. 2B also shows spring button 135 disposed within follower slot 125 of follower 105. FIG. 2B, however, shows spring button 135 in a compressed position due to the position of button tail 145 beneath a follower shelf 205. Follower shelf 205 is visible in FIG. 2B but not FIG. 2A or FIG. 1 because of the position of follower shelf 205 beneath a portion of follower neck 120. In this position, button head 140 is depressed relative to a position where button tail 145 is not beneath follower shelf 205. This depression of button head 140 by follower shelf 205 causes the compression of button top 160 and button bottom 155 as follower shelf 205 slides into position above button tail 145. When reversed and follower shelf 205 slides off of button tail 145, button top 160 and button bottom 155 spring apart pushing button head 140 back into a raised position.

FIGS. 2A and 2B illustrate that a length of follower slot 125 may be greater than a length of spring button 135. The term "length" used here refers to the left-to-right (or right-to-left) direction of FIG. 2A and FIG. 2B. The distance that spring button 135 may move within follower slot 125 independently of follower 105 is referred to as travel 210. Therefore, travel 210 is the distance between two relative positions of spring button 135 and follower 105. In one position, spring button 135 may be located as near as possible to follower head 115, wherein button tail 145 may be beneath follower shelf 205 as shown in FIG. 2B. In another position, spring button 135 may be positioned as near as possible to follower tail 130, wherein the curve of spring button 135, between button top 160 and button bottom 155, contacts follower tail 130 as shown, for example, in FIG. 3. The amount of travel 210 may be adjusted according to the use case by adjusting the size of follower slot 125. The amount of travel 210 may also relate to the amount of overpull necessary to move follower 105 into a position that will allow retraction of inner telescoping tube. Overpull and this retraction process will be discussed in further detail hereafter.

Figures 3, 4:
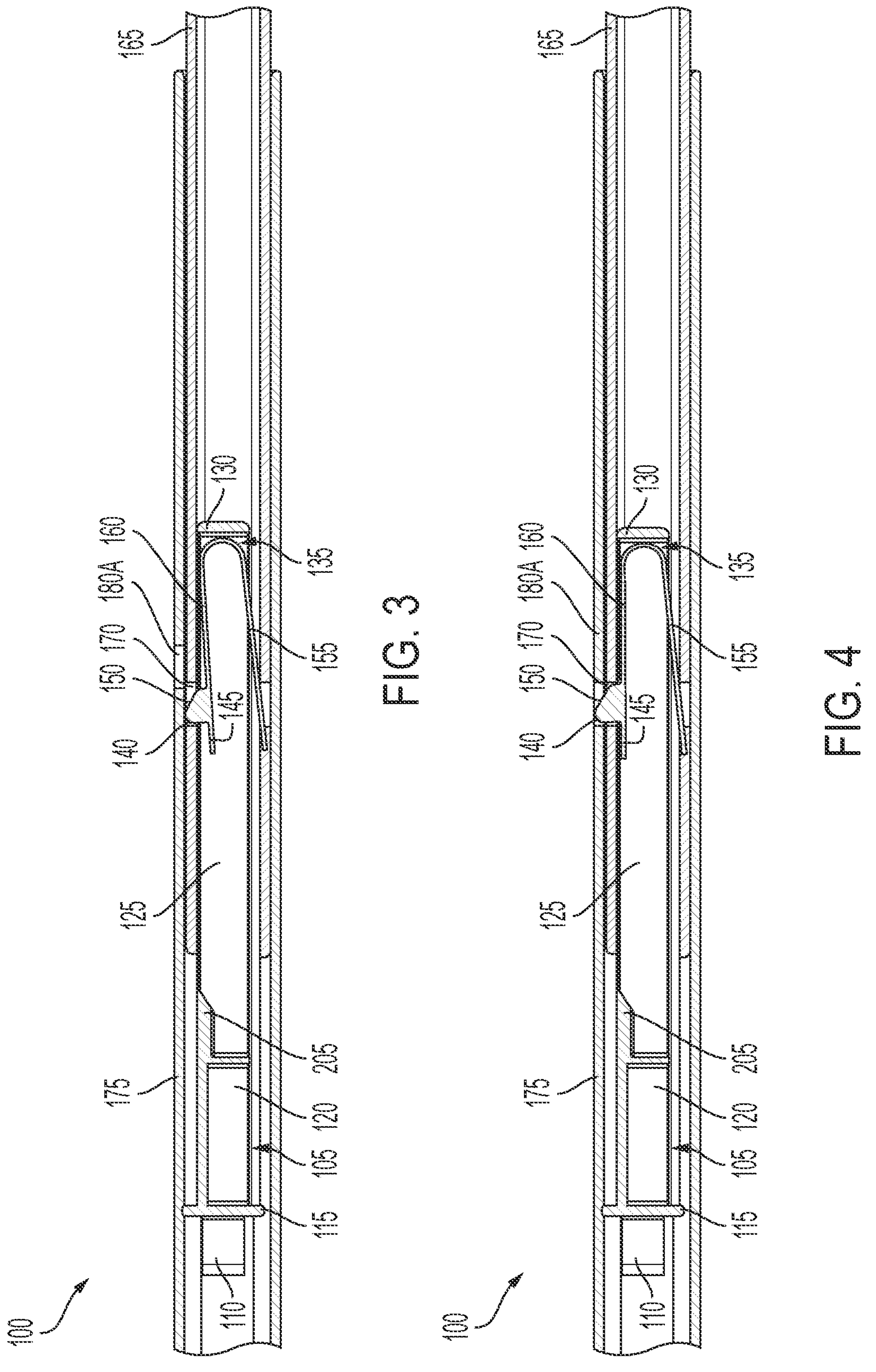
FIG. 3 illustrates a cross sectional view of an embodiment of a telescoping component unlocking system being extended.
FIG. 4 illustrates a cross sectional view of an embodiment of a telescoping component unlocking system in a locked position.

FIG. 3 illustrates a cross sectional view of an embodiment of a telescoping component unlocking system in an extended position. In some embodiments, telescoping tube assembly 100 may be comprised of outer telescopic tube 175, follower 105, spring button 135, and inner telescopic tube 165. Outer telescopic tube 175 may include locking holes 180A-C. Follower 105 may include friction surfaces 110, follower head 115, follower neck 120, follower slot 125, follower tail 130, and follower shelf 205. Spring button 135 may include button head 140, button tail 145, button ramp 150, button top 160 and button bottom 155. Inner telescopic tube 165 may include buttonhole 170.

In some embodiments, as shown in FIG. 3, spring button 135 may be disposed inside of inner telescopic tube 165 and inner telescopic tube 165 may be disposed, at least in part, inside outer telescopic tube 175. Spring button 135 may be attached to inner telescopic tube 165 so that spring button 135 may move with inner telescopic tube 165. Spring button 135 may also be disposed within follower slot 125 of follower 105.

In some embodiments, follower 105 may be disposed, in part, within both inner telescopic tube 165 and outer telescopic tube 175. Follower head 115 may be larger than inner telescopic tube 165 such that follower head 115 and friction surfaces 110 always remain within outer telescopic tube 175 and cannot move into the interior of inner telescopic tube 165. Follower 105 may not be attached to either inner telescopic tube 165 or outer telescopic tube 175 such that follower 105 may move independently of outer telescopic tube 175 and, to an extent, of inner telescopic tube 165. The extent of this independent movement with respect to inner telescopic tube 165 may be limited at one extreme by follower tail 130 contacting spring button 135 when extending the telescoping tubes, and at the other extreme by follower head 115 contacting the end of inner telescoping tube when retracting the telescoping tubes.

In FIG. 3, as inner telescopic tube 165 is extended, friction surfaces 110 of follower 105 may contact the interior surface of outer telescopic tube 175 thereby creating resistance to movement of follower 105 through outer telescopic tube 175. Inner telescopic tube 165 and button head 140 of spring button 135 may also contact outer telescopic tube 175 but with low resistance compared with that of follower 105. As a result, follower 105 may move slowly or not at all through outer telescopic tube 175 until spring button 135 contacts follower tail 130 thereby forcing follower 105 to move through outer telescopic tube 175 with spring button 135 and inner telescopic tube 165 as depicted in FIG. 3.

In some embodiments, button head 140 of spring button 135 may be depressed by the interior surface of outer telescoping tube as inner telescoping tube is extended, causing compression of button top 160 and button bottom 155. Outer telescopic tube 175 may contain a number of locking holes 180A-C. Each of the locking holes 180A-C into which spring button 135 may insert represents a locking position. In FIG. 3, inner telescopic tube 165 is being extended toward a locking position.

As mentioned previously, the amount of travel 210 may be adjusted according to the use case by adjusting the size of follower slot 125. For example, where more locking positions are needed in a given length of telescoping tube, the travel 210 may be reduced by shortening the length of the follower slot 125. Correspondingly, the amount of overpull required to bring the follower 105 into a position that allows retraction may be shorter. Conversely, a longer follower slot 125 allows for a longer overpull in cases where fewer locking positions are required in a given length of telescoping tube.

FIG. 4 illustrates a cross sectional view of an embodiment of a telescoping component unlocking system in a locked position. In some embodiments, telescoping tube assembly 100 may be comprised of outer telescopic tube 175, follower 105, spring button 135, and inner telescopic tube 165. Outer telescopic tube 175 may include locking holes 180A-C. Follower 105 may include friction surfaces 110, follower head 115, follower neck 120, follower slot 125, follower tail 130, and follower shelf 205. Spring button 135 may include button head 140, button tail 145, button ramp 150, button top 160 and button bottom 155. Inner telescopic tube 165 may include buttonhole 170.

In FIG. 4, telescoping tube assembly 100 is in a locked position. While extending telescoping tube assembly 100, spring button 135 may be depressed by outer telescopic tube 175 and may pull follower 105 along by contacting follower tail 130. In this position button tail 145 of spring button 135 may not be underneath follower shelf 205 and may therefore be free to push into locking holes 180A-C of outer telescopic tube 175 whenever locking holes 180A-C may be encountered. In FIG. 4, spring button 135 has pushed into a locking hole 180A thereby preventing retraction of inner telescoping tube. Inner telescoping tube, however, may be further extended. This unidirectional movement of inner telescoping tube when spring button 135 has pushed into locking hole 180A results from the shape of button head 140. On the side corresponding to the extending direction, button head 140 includes button ramp 150. Button ramp 150 may be sloped such that button head 140 will slide under outer telescopic tube 175 into a depressed position allowing further extension of inner telescopic pole when sufficient pressure in the direction of extension is exerted. Conversely, on the side corresponding to the retracting direction, button head 140 lacks the sloping design of button ramp 150. On the retracting side, button head 140 has a steep, nearly vertical design from the top of button head 140 down to button tail 145 causing button to contact locking hole 180A of outer telescopic tube 175 and prevent retraction.

Figures 5, 6:
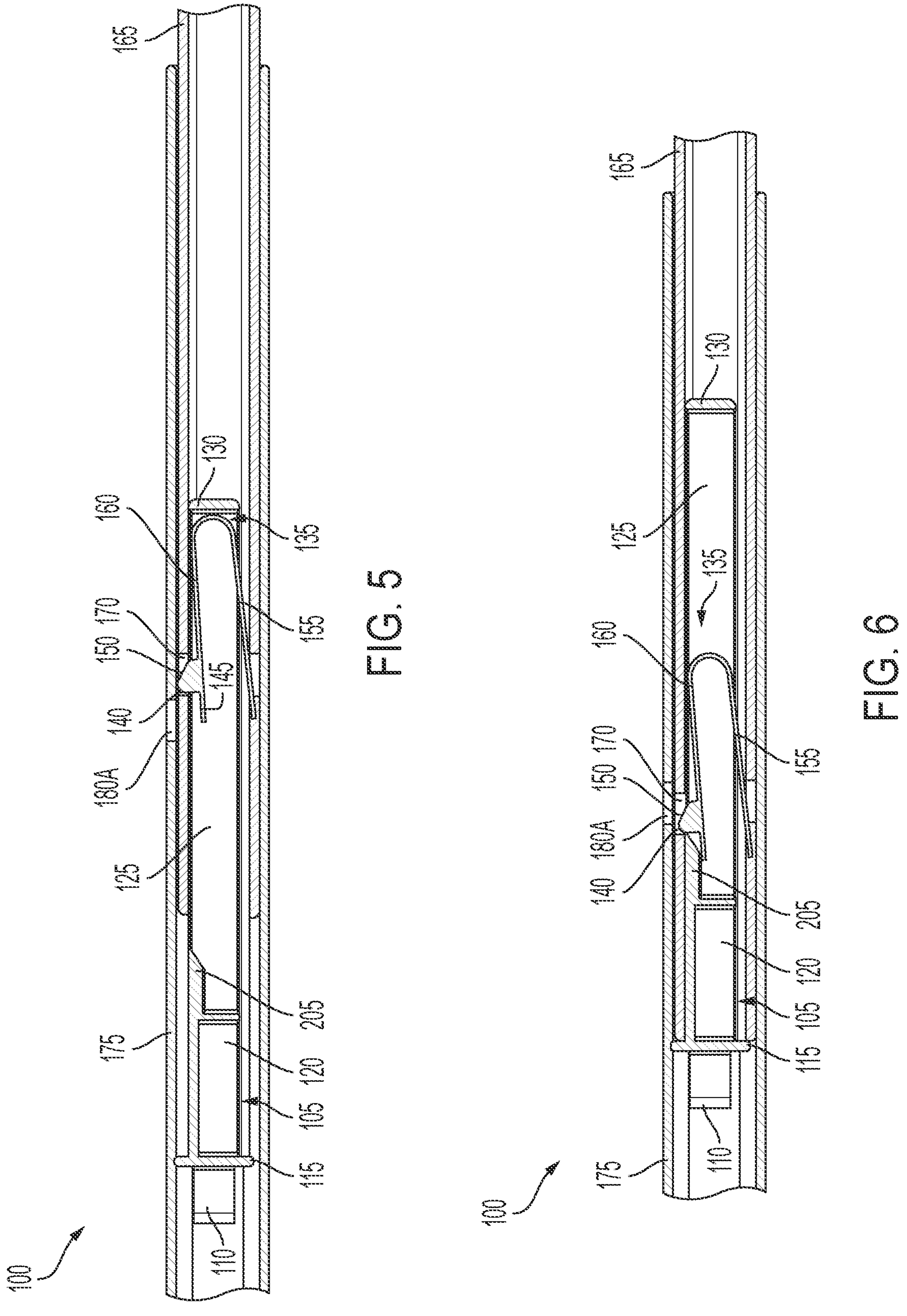
FIG. 5 illustrates a cross sectional view of an embodiment of a telescoping component unlocking system in an overpull position.
FIG. 6 illustrates a cross sectional view of an embodiment of a telescoping component unlocking system being retracted.

FIG. 5 illustrates a cross sectional view of an embodiment of a telescoping component unlocking system in an overpull position. In some embodiments telescoping tube assembly 100 may be comprised of outer telescopic tube 175, follower 105, spring button 135, and inner telescopic tube 165. Outer telescopic tube 175 may include locking holes 180A-C. Follower 105 may include friction surfaces 110, follower head 115, follower neck 120, follower slot 125, follower tail 130, and follower shelf 205. Spring button 135 may include button head 140, button tail 145, button ramp 150, button top 160 and button bottom 155. Inner telescopic tube 165 may include buttonhole 170.

In FIG. 5 inner telescopic tube 165 has been pulled beyond the locking position shown in FIG. 4. This overpull position may be accomplished by a user without the need for manually depressing button head 140. The ability to overpull in the extension direction without the need for manually depressing button head 140 may be facilitated by button ramp 150, as discussed previously. When in an overpull position and before beginning retraction, inner telescopic tube 165 and spring button 135 pull follower 105 through outer tube into a retraction position that will allow for the retraction of inner telescoping tube without the need to manually depress button head 140 when passing by locking holes 180A-C. This retraction position of follower 105 may be the distance needed to bring follower shelf 205 underneath locking hole 180A. Once follower shelf 205 is positioned beneath locking hole 180A, retraction may begin.

FIG. 6 illustrates a cross sectional view of an embodiment of a telescoping component unlocking system being retracted. In some embodiments, telescoping tube assembly 100 may be comprised of outer telescopic tube 175, follower 105, spring button 135, and inner telescopic tube 165. Outer telescopic tube 175 may include locking holes 180A-C. Follower 105 may include friction surfaces 110, follower head 115, follower neck 120, follower slot 125, follower tail 130, and follower shelf 205. Spring button 135 may include button head 140, button tail 145, button ramp 150, button top 160 and button bottom 155. Inner telescopic tube 165 may include buttonhole 170.

In FIG. 6 inner telescopic tube 165 has been retracted back into outer telescopic tube 175 relative to the overpull position shown in FIG. 5. Because of the resistance between friction surfaces 110 and the interior surface of outer telescoping tube, follower 105 may remain in the overpull position when a user begins to retract inner telescopic tube 165 into outer telescopic tube 175. Once inner telescopic tube 165 is retracted far enough for button tail 145 of spring button 135 to become fixed beneath follower shelf 205 and for the end of inner telescopic tube 165 to contact follower head 115, follower 105 may begin to move into outer telescopic tube 175 in a retracting direction with inner telescopic tube 165. Because button tail 145 may be fixed beneath follower shelf 205, button head 140 may remain depressed even when passing by locking holes 180A-C of outer telescopic tube 175.

As shown in FIG. 6, button head 140 is directly beneath locking hole 180A of outer telescopic tube 175, however, button head 140 may be unable to rise into a locking position because button tail 145 may be fixed beneath follower shelf 205 as previously described. In this manner, inner telescopic tube 165 may be retracted into outer telescopic tube 175 passing by as many locking holes 180A-C as required by user without having to manually depress button head 140 at any time.

Embodiments will be useful in a variety of applications having extendable components. Examples of possible applications are telescoping ladders, tripods, hiking poles, painting poles, support poles for easy-up canopies, support poles for tents, support poles for awnings, extendable saws, telescoping measuring sticks, and any other applications having extendable parts known to those of ordinary skill in the art.

Although the present disclosure has been described in considerable detail with reference to certain preferred versions thereof, other versions are possible. Therefore, the spirit and scope of the appended claims should not be limited to the description of the preferred versions contained therein.

What is claimed is:

1. A follower, comprising:
- at least one friction surface;
- a neck;
- at least one shelf; and
- a slot,
- wherein the at least one friction surface and the at least one shelf extend from the neck, and the slot is adjacent to the neck, and
- wherein the slot is enclosed by a tail on an end of the slot opposite the neck of the follower.

2. The follower of claim 1, further comprising a head between the neck and the at least one friction surface, wherein the at least one friction surface extends from the head and the head connects to the neck.

3. The follower of claim 2, further comprising a second friction surface, the second friction surface extending from the neck and disposed in a position opposite the first friction surface.

4. The follower of claim 1, further comprising a second friction surface, the second friction surface extending from the neck and disposed in a position opposite the first friction surface.

5. The follower of claim 1, wherein the follower has a plurality of shelves.

6. A telescoping component unlocking system, comprising:
- a first telescoping component having at least one locking hole;
- a second telescoping component having at least one buttonhole;
- a follower having at least one friction surface, a neck, at least one shelf, and a slot, wherein the at least one friction surface and the at least one shelf extend from the neck, and the slot is adjacent to the neck; and a button having at least one button head and at least one button tail, wherein the button head and the button tail extend from the button, wherein the button is insertable into the slot of the follower, both the button and at least a portion of the follower are attachable to the second telescoping component, and both the second telescoping component and at least a portion of the follower are attachable to the first telescoping component, and wherein the slot is enclosed by a tail on an end of the slot opposite the neck.

7. The telescoping component unlocking system of claim 6, wherein the first telescoping component is a tube with a cross section having a shape that is at least one of square, rectangular, circular, and circular with an indentation.

8. The telescoping component unlocking system of claim 6, wherein the second telescoping component is a tube with a cross section having a shape that is at least one of square, rectangular, circular, and circular with an indentation.

9. The telescoping component unlocking system of claim 6, wherein the button is a bent spring button.

10. The telescoping component unlocking system of claim 6, wherein the button incorporates a spring disposed between the button and the at least one button head.

11. The telescoping component unlocking system of claim 6, wherein a first side of the at least one button head is sloped at a lesser angle than a second side of the at least one button head.

12. The telescoping component unlocking system of claim 6, further comprising a head between the neck and the friction surface, wherein the friction surface extends from the head and the head connects to the neck.

13. The follower of claim 12, further comprising a second friction surface, the second friction surface extending from the neck and disposed in a position opposite the first friction surface.

14. The telescoping component unlocking system of claim 6, further comprising a second friction surface, the second friction surface extending from the neck and disposed in a position opposite the first friction surface.

15. The telescoping component unlocking system of claim 6, wherein the first telescoping component has a plurality of locking holes.

16. The telescoping component unlocking system of claim 6, wherein the second telescoping component has a plurality of buttonholes.

17. The telescoping component unlocking system of claim 6, wherein the button has a plurality of button heads wherein a first side of each of the plurality of button heads is sloped at a lesser angle than a second side of each of the plurality of button heads.

18. The telescoping component unlocking system of claim 17, wherein the button has a plurality of button tails and the follower has a plurality of shelves.

* * * * *